(12) United States Patent
Petrova et al.

(10) Patent No.: US 8,841,370 B1
(45) Date of Patent: Sep. 23, 2014

(54) WEAR-RESISTANT RUBBER BASED ON PROPYLENE OXIDE RUBBER AND ULTRAFINE POLYTETRAFLUOROETHYLENE

(71) Applicants: Nataliya Nikolaevna Petrova, Yakutsk (RU); Viktoriya Vitalievna Portnyagina, Yakutsk (RU)

(72) Inventors: Nataliya Nikolaevna Petrova, Yakutsk (RU); Viktoriya Vitalievna Portnyagina, Yakutsk (RU)

(73) Assignees: North-Eastern Federal University, Yakutsk (RU); Science Inst of Oil and Gas Problems of SB RAS, Yakutsk (RU)

( * ) Notice: Subject to any disclaimer, the term of this patent is extended or adjusted under 35 U.S.C. 154(b) by 0 days.

(21) Appl. No.: 13/889,500

(22) Filed: May 8, 2013

(51) Int. Cl.
| C08K 5/09 | (2006.01) |
| C08K 5/19 | (2006.01) |
| C08K 3/22 | (2006.01) |
| C08L 71/02 | (2006.01) |
| C08K 5/3492 | (2006.01) |

(52) U.S. Cl.
CPC . C08L 71/02 (2013.01); C08K 5/09 (2013.01); C08K 3/22 (2013.01); C08K 5/3492 (2013.01); C08K 5/19 (2013.01)
USPC .......... 524/322; 524/86; 524/87; 524/99; 524/100; 524/210; 524/211; 524/392; 524/436; 524/467; 525/403

(58) Field of Classification Search
CPC ... C08L 71/02; C08K 5/09; C08K 5/18–5/21; C08K 5/37; C08K 5/3402; C08K 3/22
USPC .......... 524/322, 86, 87, 99, 100, 210, 211, 524/392, 436, 437; 525/403
See application file for complete search history.

(56) References Cited

U.S. PATENT DOCUMENTS

| 5,376,700 A | 12/1994 | Yamazaki |
| 6,303,683 B1 | 10/2001 | Figovsky |
| 7,135,122 B2 | 11/2006 | Park |

FOREIGN PATENT DOCUMENTS

| RU | 2284338 C1 * | 9/2006 |
| RU | 2294346 C1 * | 2/2007 |

OTHER PUBLICATIONS

Petrova et al. "Rubbers Based on Mixtures of PropyleneOxide Rubber and Polytetrafluoroethylene", Kauchuk I Rezina, 2007, vol. 4, pp. 8-11.*

* cited by examiner

*Primary Examiner* — Michael M Bernshteyn
(74) *Attorney, Agent, or Firm* — Nadya Reingand; Yan Hankin

(57) ABSTRACT

A rubber compound based on propylene-oxide rubber SKPO, including sulfur, stearic acid, zinc oxide, thiuram disulphide, carbon black P-803. The compound is characterized by replacement of 2-mercaptobenzothiazole (kaptax), as well as fluoroplastic F-4, with dibenzothiazyl disulfide (altax), phenyl-β-naphthylamine (neozone D), dibutoxyethyl adipate, and ultrafine polytetrafluoroethylene (UPTFE). Such replacement of ingredients allows for significant improvement of wear resistance, frost resistance, and relative elongation. Additionally, relatively less UPTFE (compared to fluoroplastic F-4) can be used to achieve similar beneficial results, significantly reducing the cost of manufacturing the material.

6 Claims, No Drawings

WEAR-RESISTANT RUBBER BASED ON PROPYLENE OXIDE RUBBER AND ULTRAFINE POLYTETRAFLUOROETHYLENE

CROSS-REFERENCE TO RELATED APPLICATIONS

This invention claims priority to, and incorporates by reference, Russian Patent Application No. 2012119320, filed May 11, 2012.

FIELD OF THE INVENTION

The claimed invention relates to the field of rubber industries, particularly the development of elastomeric sealing materials designed for performance in extreme conditions.

BACKGROUND OF THE INVENTION

Several known methods exist for the production of synthetic wear- and weather-resistant rubber-based compositions. EP19990937488 (Pub. No. EP1161487 B1) discloses a method for production of ebonite (i.e. hard rubber) through vulcanization of rubber with sulfer, a vulcanization accelerator, and active filler, where each additive ingredient is a powder with a particle size between 5 and 85 microns.

PCT/US1998/023114 (Pub. No. WO1999023148 A1) introduces production of a wear-resistant article through incorporation of a fluorocarbon (e.g., polytetrafluoroethylene) with a polymer to produce a wear-resistant rubber compound. Compared to prior methods employing only surface treatment, actual incorporation of the material increases the longevity or permanence of the beneficial wear-resistant effect.

U.S. Pat. No. 5,240,766 discloses a composite gasket material having improved sealability and thermal stability, wherein the material contains an elastomeric binder component, a fiber component (such as carbon fibers), and a filler component.

U.S. Pat. No. 7,135,122 discloses a method of coating rubber with polytetrafluoroethylene for better resistance, where the bonded surface of the polytetrafluoroethylene portion of the composite is etched prior to application of the uncured admixture. The compounds are useful for making items such as seals, gaskets, chemically-resistant hoses, o-rings, and pump diaphragms.

U.S. Pat. No. 7,658,387 discloses a rubber composition containing a matrix of vulcanized elastomeric material with powder filler dispersed therein. In the preferred embodiment, the elastomeric material contains a micro powder which has repeating units derived from tetrafluoroethylene. The micro powder has a median particle size of between 1 and 50 µm.

Also closely related to the technical nature of and results achieved by the present invention is the durable rubber compound based on SKPO, containing sulfur, thiuram disulfide, stearic acid, zinc oxide, 2-mercaptobenzothiazole, carbon black P-803 and teflon F-4 (Petrov, N. N., Portnyagina, V. V., Fedorova, A. F., Biklybaeva, R. F., Wear resistant compound based on propylene-oxide rubber, U.S. Pat. No. 2,294,346, M.: 2007).

Disadvantages of the prior art include significant production costs associated with the introduction of large quantities (up to 25 parts by weight) of polytetrafluoroethylene F-4 and significant reduction of the rubber's frost resistance coefficient during introduction.

SUMMARY OF THE INVENTION

The present invention introduces a new rubber compound based on propylene-oxide rubber SKPO. Similar to SKPO, the composite includes sulfur, stearic acid, zinc oxide, thiuram disulphide, and carbon black P-803. Additionally, however, kaptax and fluoroplastic F-4 are removed from the traditional composition and replaced by altax, neozone D, dibutoxyethyl adipate, and ultrafine polytetrafluoroethylene (UPTFE). Each ingredient is combined in specific parts by weight as described below by the method of this invention.

The resulting compound increases rubber wear resistance (up to 33%), frost resistance (up to 33%), and relative elongation (up to 17%) compared to the prior art. Manufacturing costs are also significantly reduced because achieving positive effects requires addition of significantly smaller quantities of fluoropolymer additives (1 part UPTFE versus 15 parts traditional fluoroplastic F-4). Use of rubber compounds with the claimed composition will improve the service life of rubber seals when used in sealing devices and other applications.

DETAILED DESCRIPTION OF THE PREFERRED EMBODIMENT

The developed rubbers exhibit high levels of wear resistance and can be used for producing rubber parts, which can be used in numerous sealing assemblies for machines and mechanisms, as well as other applications. For example, the invention could be used for producing seals for insulating windows in regions with cold climates, due to the elastomeric nature of the material. Propylene oxide rubber (GPO) is characterized by a high resistance not only to low temperatures (the glass transition temperature was 74° C.), but to ozone and heat (i.e. high temperatures) as well (Govorova, O. A. et al., "Development of weatherproof rubber with improved low temperature and adhesive properties," Caoutchouc and Rubber, M.: 1999, No 2, pp. 18-20; Govorova, O. A. et al. "Use of epichlorohydrin and propylene oxide rubber additives to improve performance temperature range of rubber based on butadiene-nitrile rubber," Caoutchouc and Rubber, M.: 2000, No 4, pp. 18-20).

The present invention's technical objective is to increase durability and frost resistance on the basis of propylene-oxide rubber.

This proposed objective is attained in that, unlike the prior art, the rubber compound, in addition to rubber, dispersant, activator, filler, and vulcanization accelerator, contains an ultrafine polytetrafluoroethylene powder (UPTFE, TU 2229-004-02698192-2002) instead of polytetrafluoroethylene F-4 (F-4 fluoroplastic, GOST 10007-80) having chemical formula: (—CF2-CF2-)$_n$.

Ultrafine polytetrafluoroethylene has, in addition to characteristics inherent to traditional polytetrafluoroethylene, improved adhesion to metallic surfaces and partial solubility (alcohol, acetone). These properties are associated with the presence of new groups of macromolecules and nanostructures—blocks and films—which are formed from macromolecules with low molecular weight $(CF_3(C_2F_4)_m CFCF_2, CF_3 (C_2F_4)_k CF_3, m,k<<n)$. The average particle size is 0.6 microns, the average value of the specified geometric surface is 5.5 m$^2$/cm$^3$, and UPTFE temperature is 232-320° C. (while the fluoroplastic F-4 has crystallite $T_{PL}$+327° C., and amorphous regions $T_A$+120° C.). The average particle size of fluoroplastic F-4 powder is 50-100 microns (Buznik, V. M., Fomin, V. M., Alchemov, A. P. et al., "Metal-polymer nanocomposites." Novosibirsk: Vol. SB RAS, 2005, p. 260).

Also, in the present invention, instead of kaptax (2-mercaptobenzothiazole), the vulcanizing agent is altax (benzothiazyl disulfide), an accelerator for thiazoles of average activity (Koshelev, F. F., Kornev, A. E., Bukhanov, A. M., "General technology of rubber." 4th ed., M.: Chemistry, 1978, p. 164).

The compound also contains phenyl-β-naphthylamine (neozone D), which is an anti-aging amine type that slows down the aging of rubber (Koshelev, F. F., Kornev, A. E., Bukhanov, A. M., "General technology of rubber." 4th ed., M.: Chemistry, 1978, p. 198), and a plasticizer—dibutoxyethyladipate (DBEA, TU 2497-127-55778270-2002), which has good compatibility with polar rubber (DBEA solubility parameter=8.20 (cal/cm$^3$)$^{0.5}$) and low volatility. Use of the plasticizer enables production of rubber with greater frost resistance. The rubber composition is given in Table 1 below.

gation (up to 17%) compared to the prototype/prior art. This significantly reduces manufacturing costs, as achieving positive effects requires addition of significantly smaller quantities of fluoropolymer additives (1 part UPTFE versus 15 parts traditional fluoroplastic F-4). Use of rubber compounds with the claimed composition will improve the service life of rubber seals when used in sealing devices and other applications.

TABLE 1

Rubber composition

| | Prototype | Invention | | | | | Control | |
|---|---|---|---|---|---|---|---|---|
| | | 1 | 2 | 3 | 4 | 5 | 6 | 7 |
| SKPO | 100 | 100 | 100 | 100 | 100 | 100 | 100 | 100 |
| Stearic Acid | 1.0 | 1.0 | 1.0 | 1.0 | 1.0 | 1.0 | 1.0 | 1.0 |
| Zinc Oxide | 3.0 | 5.0 | 5.0 | 5.0 | 5.0 | 5.0 | 5.0 | 5.0 |
| Dibenzothiazyl disulfide | | 1.5 | 1.5 | 1.5 | 1.5 | 1.5 | 1.5 | 1.5 |
| 2-mercaptobenzothiazole | 2.0 | — | — | — | — | — | — | — |
| Thiuram disulfide | 2.0 | 1.0 | 1.0 | 1.0 | 1.0 | 1.0 | 1.0 | 1.0 |
| Phenyl- β-naphthylamine | — | 2.0 | 2.0 | 2.0 | 2.0 | 2.0 | 2.0 | 2.0 |
| Carbon black P-803 | 60.0 | 60.0 | 60.0 | 60.0 | 60.0 | 60.0 | 60.0 | 60.0 |
| Dibutoxyethyladipate | — | 10.0 | 10.0 | 10.0 | 10.0 | 10.0 | 10.0 | 10.0 |
| Sulfur | 1.5 | 1.5 | 1.5 | 1.5 | 1.5 | 1.5 | 1.5 | 1.5 |
| Fluoroplastic F-4 | 15 | — | — | — | — | — | — | — |
| Ultrafine polytetrafluoroethylene UPTFE | — | 0.5 | 1.0 | 3.0 | 5.0 | 10.0 | 0 | 15.0 |

The ultrafine polytetrafluoroethylene powder is added to the rubber compound at the mixing stage of raw rubber with ingredients on standard equipment. Rubber compound vulcanization is carried out at 150° C. and a pressure of 12.0 MPa for 30 minutes, exposing the vulcanizates before testing for at least 6 hours.

Vulcanizate physico-mechanical properties are determined according to GOST 270-84 as follows: residual compressive strain (RCS) by GOST 9.029-74, volumetric wear by GOST 25509-79, frost resistance coefficient while in tension by GOST 408-78. Vulcanizate properties are shown in Table 2 below.

It will be understood by those skilled in the art that various changes in form and details may be made therein without departing from the spirit and scope of the invention as set forth in the appended claims. Those skilled in the art will recognize, or be able to ascertain using no more than routine experimentation, many equivalents to the specific embodiments of the invention described herein. Such equivalents are intended to be encompassed in the scope of the claims.

What is claimed is:

1. A rubber composition, based on propylene-oxide rubber SKPO, comprising the following ingredients in parts by

TABLE 2

Rubber properties

| | Prototype | Invention | | | | | Control | |
|---|---|---|---|---|---|---|---|---|
| | | 1 | 2 | 3 | 4 | 5 | 6 | 7 |
| Relative Tensile Strength (MPa) | 14.5 | 7.4 | 7.4 | 7.9 | 7.9 | 7.4 | 7.5 | 7.9 |
| Relative elongation at break (%) | 228 | 240 | 268 | 268 | 232 | 230 | 192 | 228 |
| Relative stress at extension 100%, MPa | 6.6 | 3.3 | 3.2 | 3.2 | 3.2 | 3.6 | 4.9 | 3.7 |
| Frost resistance coefficient during tension at −50° C. | 0.74 | 0.99 | 0.97 | 0.98 | 0.96 | 0.95 | 0.88 | 0.90 |
| Residual compressive strain (100° C., 72 hr), % | 51.5 | 54.0 | 52.0 | 52.0 | 62.0 | 63.0 | 55.3 | 68.0 |
| Volumetric wear, cm$^3$ | 0.15 | 0.11 | 0.10 | 0.12 | 0.13 | 0.14 | 0.17 | 0.15 |

Use of the present invention is implemented on standard equipment with minimal changes to technological modes of processing mixtures, thus increasing rubber wear resistance (up to 33%), frost resistance (up to 33%), and relative elonweight relative to amount of propylene-oxide rubber SKPO: 1% stearic acid, 5% zinc oxide, 1.5% dibenzothiazyl disulfide (altax), 1% thiuram disulfide, 2% phenyl-β-naphthylamine (neozone D), 60% carbon black P-803, 10% dibutoxyethyladipate, 1.5% sulfur, and ultrafine polytetrafluoroethylene (UPTFE-TU 2229-004-02698192-2002) ranging from 0.5% to 10%.

2. The composition according to claim 1, wherein the percentage by weight of ultrafine polytetrafluoroethylene (UPTFE-TU 2229-004-02698192-2002) is 0.5%.

3. The composition according to claim 1, wherein the percentage by weight of ultrafine polytetrafluoroethylene (UPTFE-TU 2229-004-02698192-2002) is 1%.

4. The composition according to claim 1, wherein the percentage by weight of ultrafine polytetrafluoroethylene (UPTFE-TU 2229-004-02698192-2002) is 3%.

5. The composition according to claim 1, wherein the percentage by weight of ultrafine polytetrafluoroethylene (UPTFE-TU 2229-004-02698192-2002) is 5%.

6. The rubber composition according to claim 1, wherein said ultrafine polytetrafluoroethylene (UPTFE-TU 2229-004-02698192-2002) is in the form of a powder, having an average particle size of less than one micron.

\* \* \* \* \*